(12) United States Patent
Wilton (10) Patent No.: US 9,158,501 B2
(45) Date of Patent: Oct. 13, 2015

(54) METHOD AND APPARATUS FOR GENERATING RANDOM NUMBERS BASED ON PACKETIZED MEDIA DATA

(71) Applicant: VONAGE NETWORK LLC, Holmdel, NJ (US)

(72) Inventor: Arthur Wilton, East Windsor, NJ (US)

(73) Assignee: VONAGE NETWORK LLC, Holmdel, NJ (US)

( * ) Notice: Subject to any disclaimer, the term of this patent is extended or adjusted under 35 U.S.C. 154(b) by 442 days.

(21) Appl. No.: 13/716,541

(22) Filed: Dec. 17, 2012

(65) Prior Publication Data

US 2014/0172933 A1     Jun. 19, 2014

(51) Int. Cl.
    *G06F 7/58*     (2006.01)

(52) U.S. Cl.
    CPC ............ *G06F 7/588* (2013.01); *G06F 7/582* (2013.01)

(58) Field of Classification Search
    None
    See application file for complete search history.

(56) References Cited

U.S. PATENT DOCUMENTS

| | | | |
|---|---|---|---|
| 5,732,138 A | 3/1998 | Noll et al. | |
| 5,757,923 A | 5/1998 | Koopman, Jr. | |
| 6,430,170 B1 * | 8/2002 | Saints et al. | 370/335 |
| 6,993,542 B1 * | 1/2006 | Meiyappan | 708/250 |
| 7,170,996 B1 * | 1/2007 | Sarkar | 380/46 |
| 7,177,430 B2 | 2/2007 | Kim | |
| 7,747,665 B2 | 6/2010 | Liardet et al. | |
| 8,108,681 B2 | 1/2012 | Venkiteswaran | |
| 2004/0141614 A1 * | 7/2004 | Choi et al. | 380/200 |
| 2007/0157026 A1 * | 7/2007 | Zimmermann | 713/171 |
| 2008/0136697 A1 | 6/2008 | Cho et al. | |
| 2012/0179735 A1 * | 7/2012 | Ferguson et al. | 708/254 |

FOREIGN PATENT DOCUMENTS

JP         2007274533 A     10/2007

OTHER PUBLICATIONS

"Random Number Generation in libzrtp", Dec. 2009, retrieved from http://zfone.com/docs/sdk/man/html/rng.html.*
D. Eastlake, J. Schiller, and S. Crocker, "RFC 4086—Randomness Requirements for Security", Jun. 2005.*

* cited by examiner

*Primary Examiner* — Chuong D Ngo
*Assistant Examiner* — Matthew Sandifer
(74) *Attorney, Agent, or Firm* — Moser Taboada; Joseph Pagnotta (57) ABSTRACT

A method and apparatus for generating random numbers based on packetized media data comprising querying one or more packetized media devices for a predetermined number of bits from one or more current real-time transport protocol (RTP) session, receiving the predetermined number of bits from the one or more packetized media devices, assembling the predetermined number of bits into a set of bytes; and converting the second set of bytes into a numerical value.

17 Claims, 7 Drawing Sheets

METHOD AND APPARATUS FOR GENERATING RANDOM NUMBERS BASED ON PACKETIZED MEDIA DATA

BACKGROUND OF THE INVENTION

1. Field of the Invention

Embodiments of the present invention generally relate to random number generation and, more particularly, to a method and apparatus for generating random numbers based on packetized media data.

2. Description of the Related Art

Generating a sequence of numbers which appears to lack a pattern, or random number generation, has many applications in computing. For example, statistical analysis relies on the generation of large amounts of random data in order to function. However, creating such large datasets and assuring that the datasets are random or pseudo-random requires high computational complexity and time. Random numbers are also used in security applications, cryptography. Many of these applications rely on pseudo-random numbers as opposed to truly random numbers. Pseudo-random numbers rely on computational algorithms to produce an apparently random number, but the algorithm is based off a number or an initial set of numbers, known as a seed. However, because these pseudo random number generators rely on a seed, the output is inherently predictable. Predictability, especially in sensitive technology areas such as cryptology, leads to security vulnerabilities which can be exploited by malicious software.

Therefore, there is a need in the art for a method and apparatus for decreasing the predictability inherent in pseudo-random number generation.

SUMMARY OF THE INVENTION

An apparatus and/or method for generating random numbers based on a packetized media, substantially as shown in and/or described in connection with at least one of the figures, as set forth more completely in the claims.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method for generating random numbers by sampling packetized media data from particular sampling points located through at a VoIP network. The method then concatenates the bits of the packetized media data and generates a numerical value which either represents a random number or is used as a seed for a random number.

Figure 1:
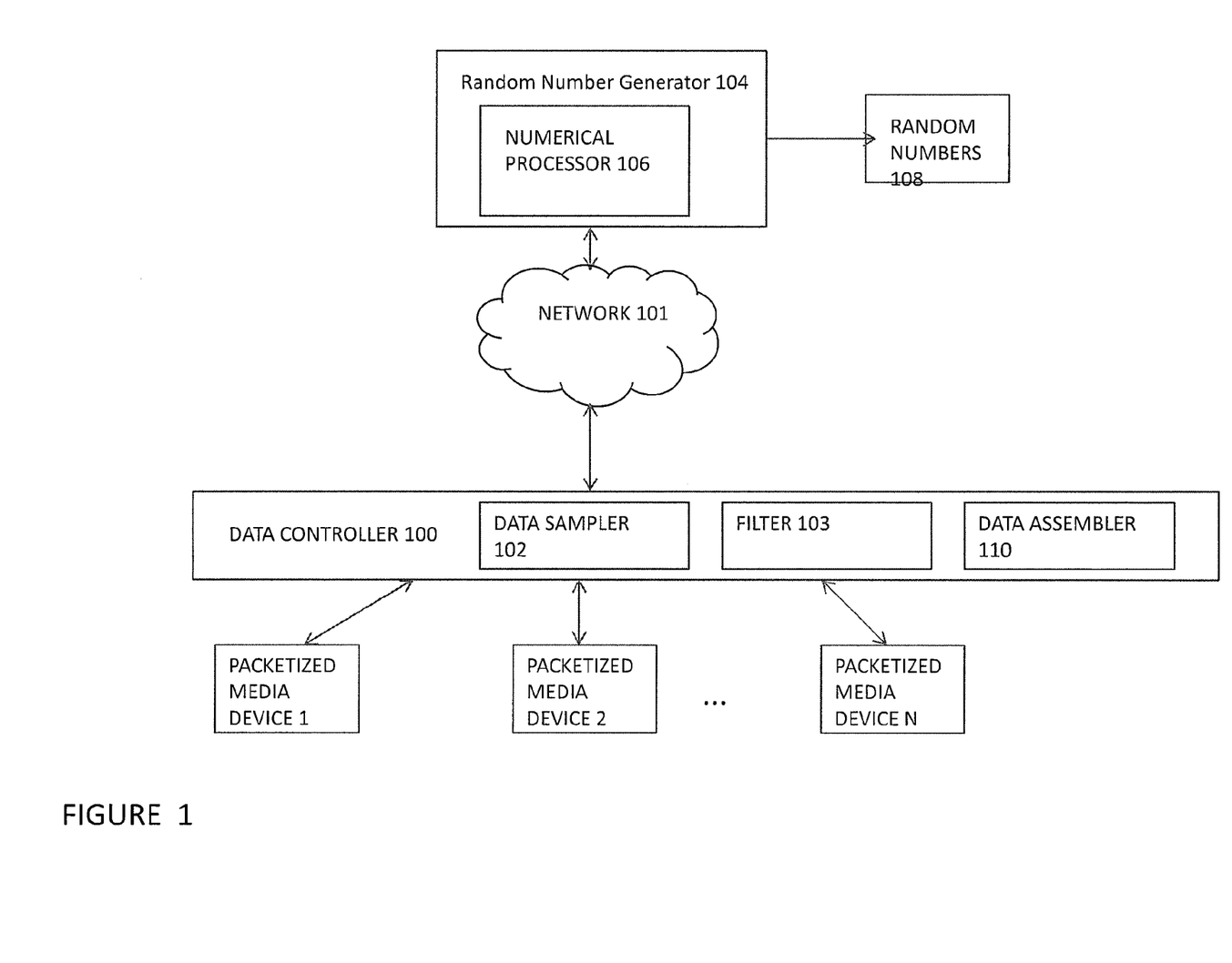
FIG. 1 depicts a functional block diagram for a system to generate random numbers according to exemplary embodiments of the present invention.

FIG. 1 depicts a functional block diagram for a system to generate random numbers. The system 100 comprises a random number generator (RNG) 104, with a numerical processor 106. The random number generator 104 outputs random numbers 108. In some instances, the RNG 104 outputs random numbers 108 based on some input to the numerical processor 106, and in other instances the RNG 104 may determine the random numbers 108 according to known random number generation algorithms.

According to one embodiment of the present invention, the system further comprises a network 101, a data controller 100 and several packetized media devices, for example, packetized media device 1, packetized media device 2 to packetized media device N. The packetized media device host various simultaneous real time transport protocol (RTP) sessions currently taking place between voice over IP (VoIP) subscribers, or between VoIP subscribers and non-VoIP receivers, on a VoIP network, such as network 101. According to one embodiments, media relays, one form of packetized media devices, are used as the primary capture and sampling points for data in the VoIP network 101.

The data controller 100 comprises a data sampler 102, a filter 103 and a data assembler 110. According to some embodiments, the RNG 104 may send a request over the network 101 to receive a numerical value to function as a "seed" from the network 101 with which to generate random numbers 108 through the numerical processor 106. A seed refers to a value which is used initially to generate a set of random numbers by an algorithm. A seed value given to the same algorithm to generate random numbers will always generate the same set of random numbers. In other instances, the received numerical value is not used as a seed by the numerical processor 106, but is stored as one of the random numbers 108 directly.

The data controller 100 queries the packetized media device for N bits of packetized media data to be returned, as required by the RNG 104. For example, in one instance, the RNG requires eight bytes to generate a random number. The RNG 104 transmits a request for the data controller 100 to return N bits over the network 101. The data controller 100 receives the request and submits a query to any one of the media relays 1 to N. The media relays 1 to N select bits from ongoing RTP sessions and return the bits of data to the data controller 100.

According to one embodiment, the data assembler 110 assembles the bytes by concatenating the eight bytes together from the first received to the last received. The data controller 100 then transmits the assembled bytes back to the RNG 104 through the network 101. In one embodiment, the numerical processor 106 converts the eight bytes into a decimal value and stores the decimal value as one of the random numbers 108. In another embodiment, the numerical processor 106 converts the eight bytes into a decimal value and uses the decimal value as a seed to generate a the random numbers 108.

The data sampler 102 transmits a sampling query to the media relays. For example, if data sampling is enabled, or requested by the RNG 104, the data sampler 102 requests that one or more of the media relays return N bits periodically. The media relays will then return 2 bytes, for example, every 8 milliseconds.

The data sampler 102 receives these bytes from whichever media relays are being employed and couples the received bytes to the data assembler 110 to assemble the bytes according to a requested order. In some embodiments, the bytes are assembled randomly. In other embodiments, the bytes are concatenated as they are received and assembled temporally by the data assembler 110.

The filter 103 is an optional module of the data controller 100 which filters out noise from the data received from the packetized media devices according to conventional audio filtering methods. In some instances, the filter is unused to increase the randomness of the data from the packetized media devices.

Figure 2A:
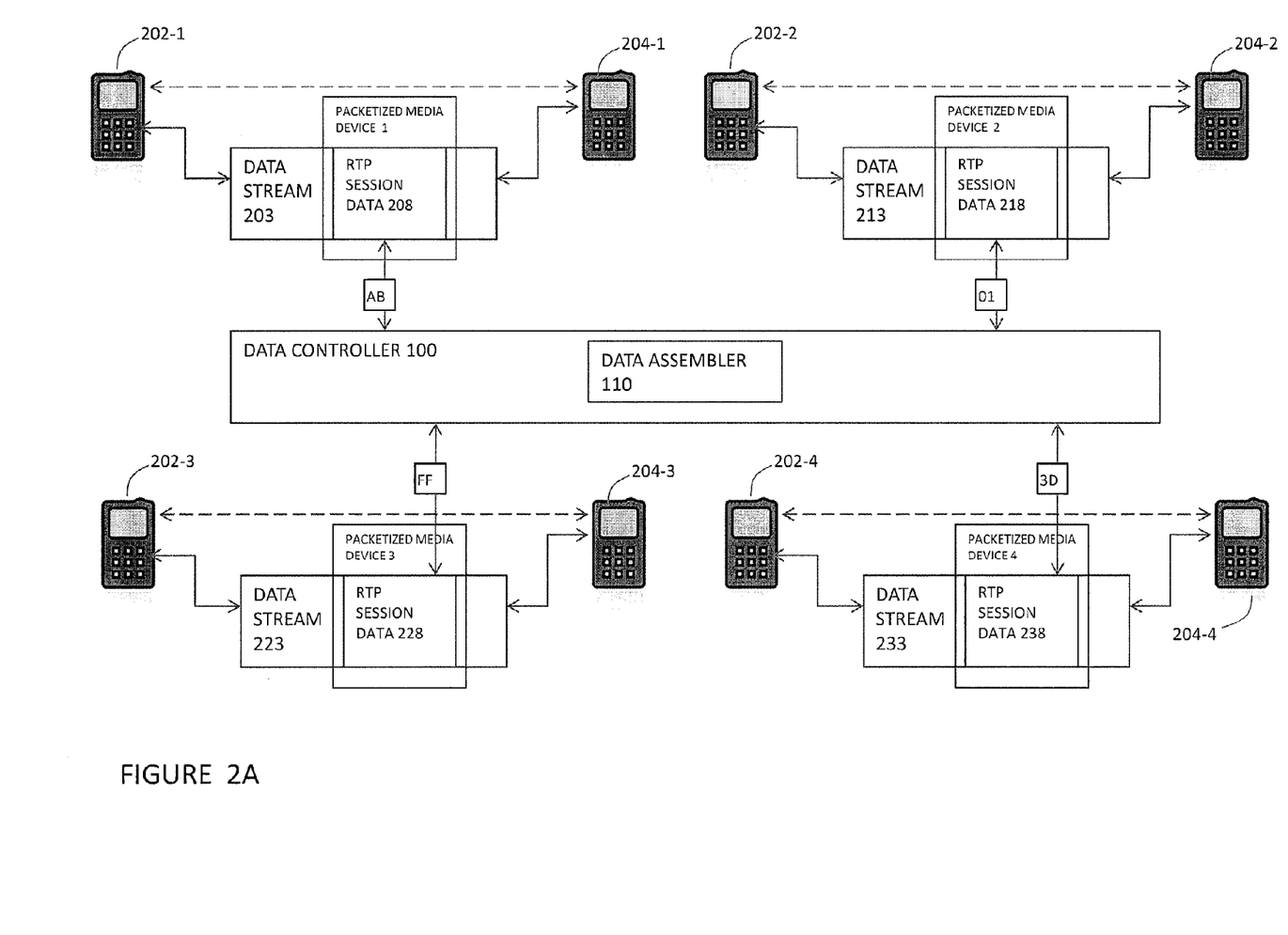
FIG. 2A depicts an RTP session conducted between handset pairs according to exemplary embodiments of the present invention.

FIG. 2A depicts an RTP session conducted between handset pairs 202-1 and 204-1, 202-2 and 204-2, 202-3 and 204-3, and 202-4 and 204-4. The handset 202-1 initiates an RTP session through network 101 (for simplicity, not shown) with handset 204-1 through media relay 1. The handsets 202-1 and 204-1 have a data stream 203 between them, being transmitted through the media relay 1. The media relay 1 contains RTP session data 208 for the RTP session between handset 202-1 and 204-1. Similarly, handset pair 202-2 to 202-4 and 204-2 and 204-4 have respective RTP sessions 218, 228 and 238 occurring simultaneously with corresponding data streams 213, 223 and 233 respectively between them.

The data controller 100 queries the media relays 1, 2 3 and 4 to return N number of bytes of the RTP session data 208 from the RTP session. As described above, the data may be from contemporaneous RTP sessions, or the bytes may be sampled periodically over time, over multiple sets of packetized media devices using the data sampler 102. For example, the byte "AB" is received from the media relay 1, the byte 01 is received from media relay 2, the byte FF is received from media relay 3 and the byte 3D is received from media relay 3.

In some instances, the bytes may be assembled by the data assembler 110 to form the number "AB01FF3D" (hexadecimal). In other instances, if only 2 bytes were requested, the bytes received by the data controller 100 may be only "AB". According to other embodiments, the assembler 110 may form the number "01FFAB3D", i.e., a randomly combination of the bytes received from media relays 1-4.

Figure 2B:
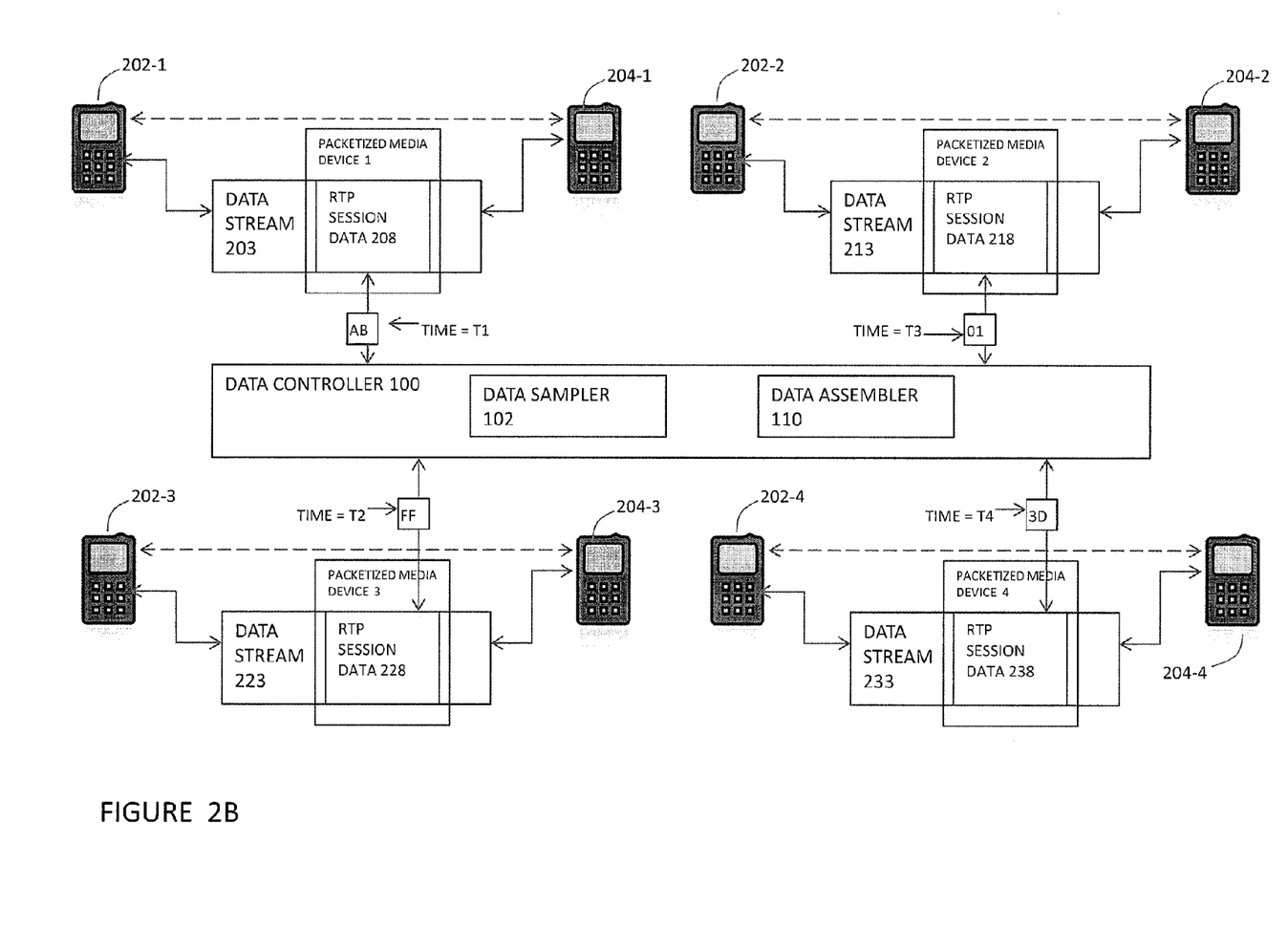
FIG. 2B depicts an RTP session conducted between handset pairs according to exemplary embodiments of the present invention.

FIG. 2B depicts an RTP session conducted between handset pairs 202-1 and 204-1, 202-2 and 204-2, 202-3 and 204-3, and 202-4 and 204-4. The handset 202-1 initiates an RTP session through network 101 (for simplicity, not shown) with handset 204-1 through media relay 1. The handsets 202-1 and 204-1 have a data stream 203 between them, being transmitted through the media relay 1. The media relay 1 contains RTP session data 208 for the RTP session between handset 202-1 and 204-1. Similarly, handset pair 202-2 to 202-4 and 204-2 and 204-4 have respective RTP sessions 218, 228 and 238 occurring simultaneously t with corresponding data streams 213, 223 and 233 respectively between them. Further, FIG. 2B shows that at a particular time, the data sampler 102 of the data controller 100 samples bytes from media relay 1-4 over a period of time.

At time t1, the data sampler 102 receives bytes AB from media relay 1; at time t2, the data sampler 102 receives bytes FF from media relay 3; at time t3, the data sampler 102 receives bytes 01 from media relay 2; and at time t4, the data sampler 102 receives bytes 3D from media relay 4. As previously disclosed, the assembler 110 may concatenate the bytes temporally, or may randomly concatenate the bytes to return to the RNG 104.

Figure 2C:
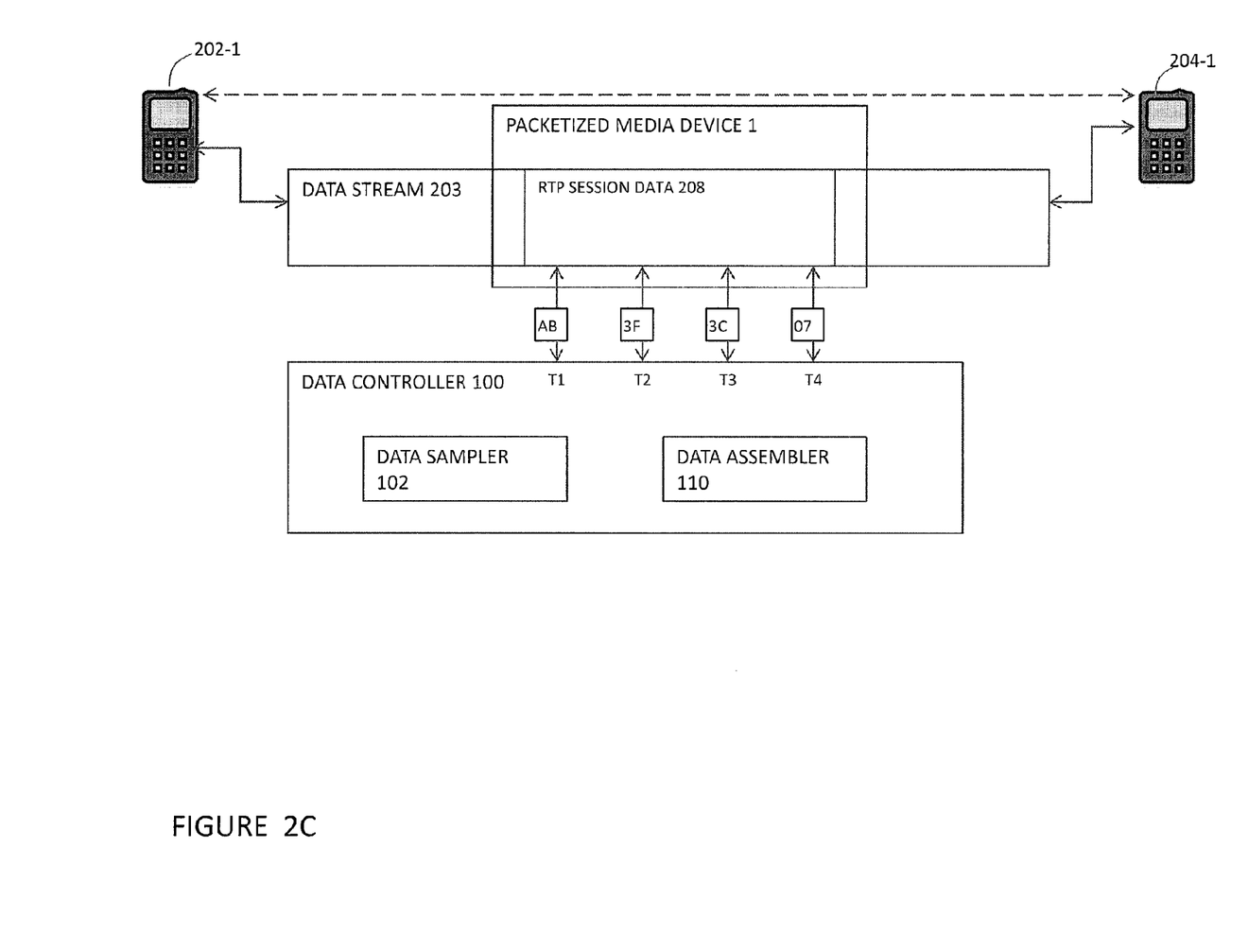
FIG. 2C depicts an RTP session conducted between handset pairs according to exemplary embodiments of the present invention.

FIG. 2C depicts an RTP session conducted between handset pairs 202-1 and 204-1. The handset 202-1 initiates an RTP session through network 101 (for simplicity, not shown) with handset 204-1 through media relay 1. According to this embodiment, the data sampler 102 of the data controller 100 receives bytes of data from the RTP session data 208 of the data stream 203 at periodic intervals. For example, at time T1, the bytes "AB" are received; at time T2, the bytes "3F" are received; at time T3, the bytes "3C" are received and at time T4, the bytes "07" are received The data assembler 110 then assembles the bytes in temporal order, in random order, or in any preferred ordering according to the RNG 104. The data controller 100 then couples with the RNG 104 over the network 101 to deliver the assembled set of bytes as a seed or as one of the random numbers 108.

Figure 3:
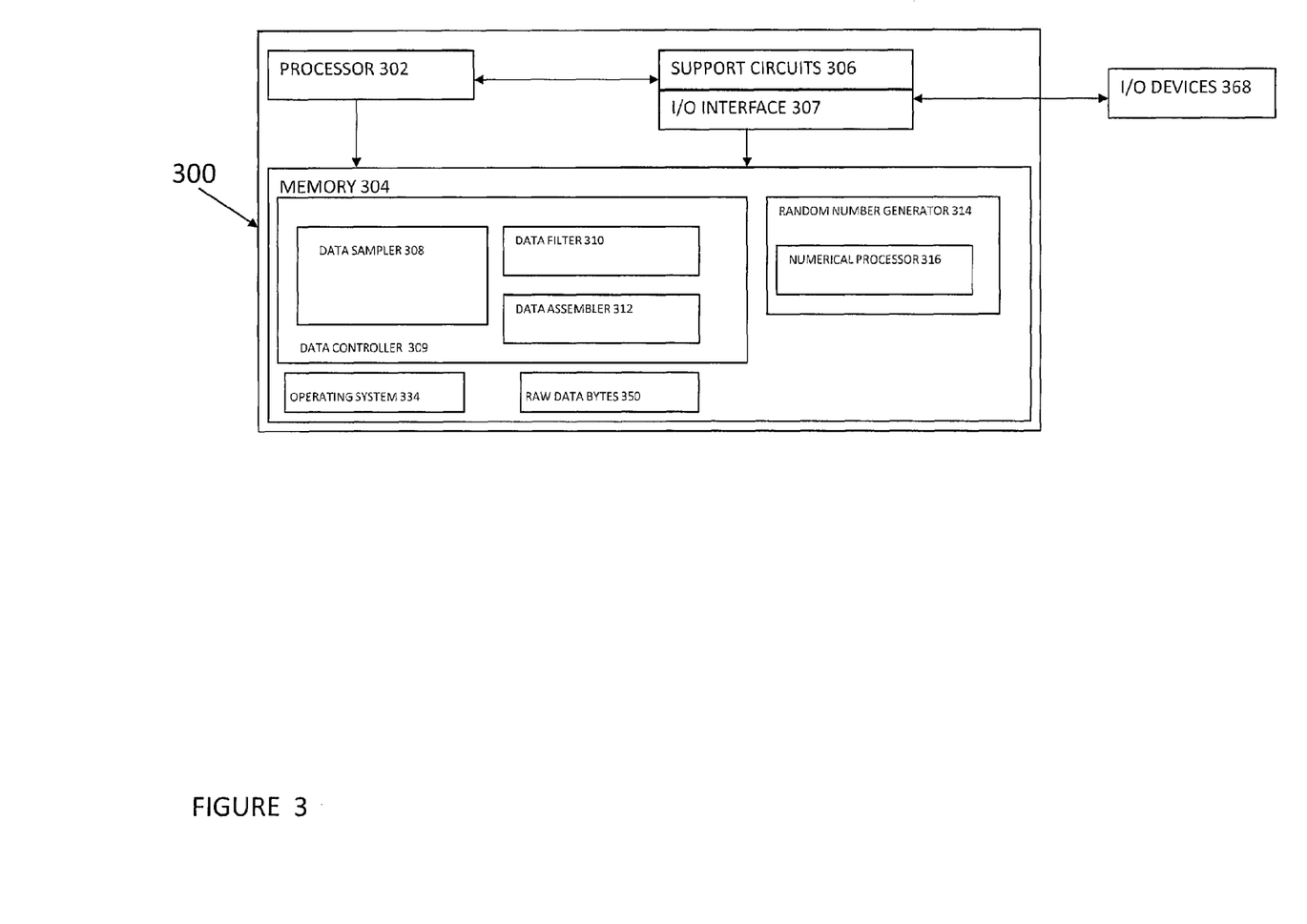
FIG. 3 depicts an implementation of the data controller of FIG. 1 by the computer system in accordance with at least one embodiment of the present invention.

FIG. 3 depicts an implementation of the data controller 100 of FIG. 1 by the computer system 300 in accordance with at least one embodiment of the present invention. In some embodiments, data controller 100 may be implemented using a plurality of such computers, for example a group of servers. The computer system 300 includes a processor 302, various support circuits 306, and memory 304. The processor 302 may include one or more microprocessors known in the art. The support circuits 306 for the processor 302 include conventional cache, power supplies, clock circuits, data registers, I/O interface 307, and the like. The I/O interface 307 may be directly coupled to the memory 304 or coupled through the supporting circuits 306. The I/O interface 307 may also be configured for communication with input devices and/or output devices 368 such as network devices, various storage devices, mouse, keyboard, display, video and audio sensors, IMU and the like.

The memory 304, or computer readable medium, stores non-transient processor-executable instructions and/or data that may be executed by and/or used by the processor 302. These processor-executable instructions may comprise firmware, software, and the like, or some combination thereof. Modules having processor-executable instructions that are stored in the memory 304 comprise a data controller 309.

As described below, in an exemplary embodiment, the data controller 309 comprises a data sampler 308, a data filter 310 and a data assembler 312. The memory 304 also stores the raw data bytes 350 generated by the data assembler 312.

The computer 300 may be programmed with one or more operating systems (generally referred to as operating system (OS) 334), which may include OS/2, Java Virtual Machine, Linux, Solaris, Unix, HPUX, AIX, Windows, Windows95, Windows98, Windows NT, and Windows2000, Windows ME, Windows XP, Windows Server, among other known platforms. At least a portion of the operating system 334 may be disposed in the memory 304.

The memory 304 may include one or more of the following random access memory, read only memory, magneto-resistive read/write memory, optical read/write memory, cache memory, magnetic read/write memory, and the like, as well as signal-bearing media as described below.

Figure 4:
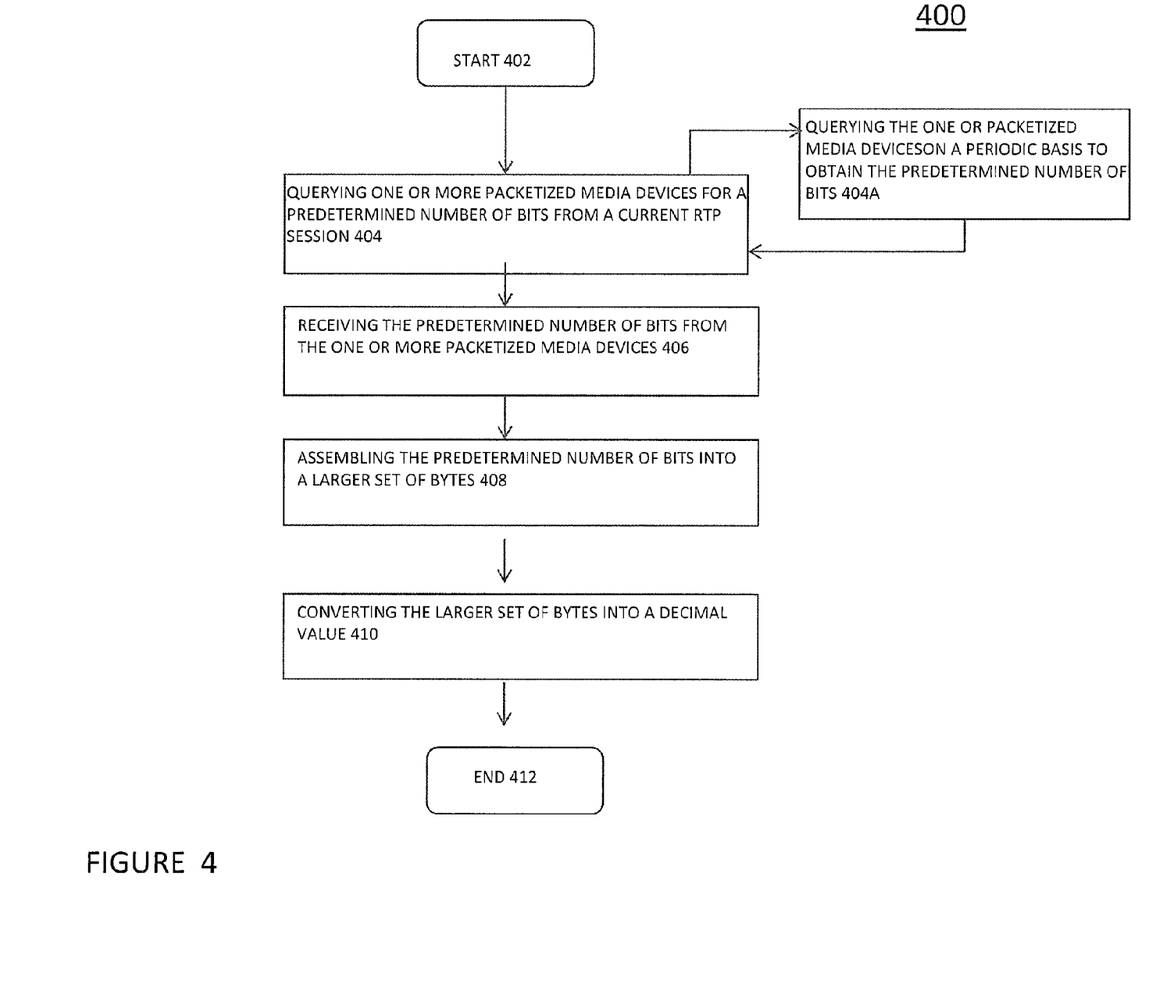
FIG. 4 depicts a flow diagram of a method for generating random numbers based on media relay data in accordance with embodiments of the present invention.

FIG. 4 depicts a flow diagram of a method 400 for generating random numbers based on data from packetized media devices such as media relays in accordance with embodiments of the present invention. The method 400 is an implementation of the data controller 309 as executed by the processor 302 by the computer system 300 as shown in FIG. 3.

The method begins at step 402 and proceeds to step 404. At step 404, the data controller 100 queries one or more packetized media devices for a predetermined number of bits from a currently ongoing RTP audio session. At sub-step 404A, the data sampler 308 in FIG. 3 queries the one or more packetized media devices on a periodic basis to obtain the predetermined number of bits.

The method then proceeds to step 406, where the data controller 309 receives the predetermined number of bits from the one or more packetized media devices.

At step 408, the data assembler 312 assembles the predetermined number of bits into a larger set of bytes. The bytes are then converted to a numerical value at step 410, where a numerical value in computer programming may be a bit, byte, short, int, long, float, double, or the like. The method terminates at step 412.

Figure 5:
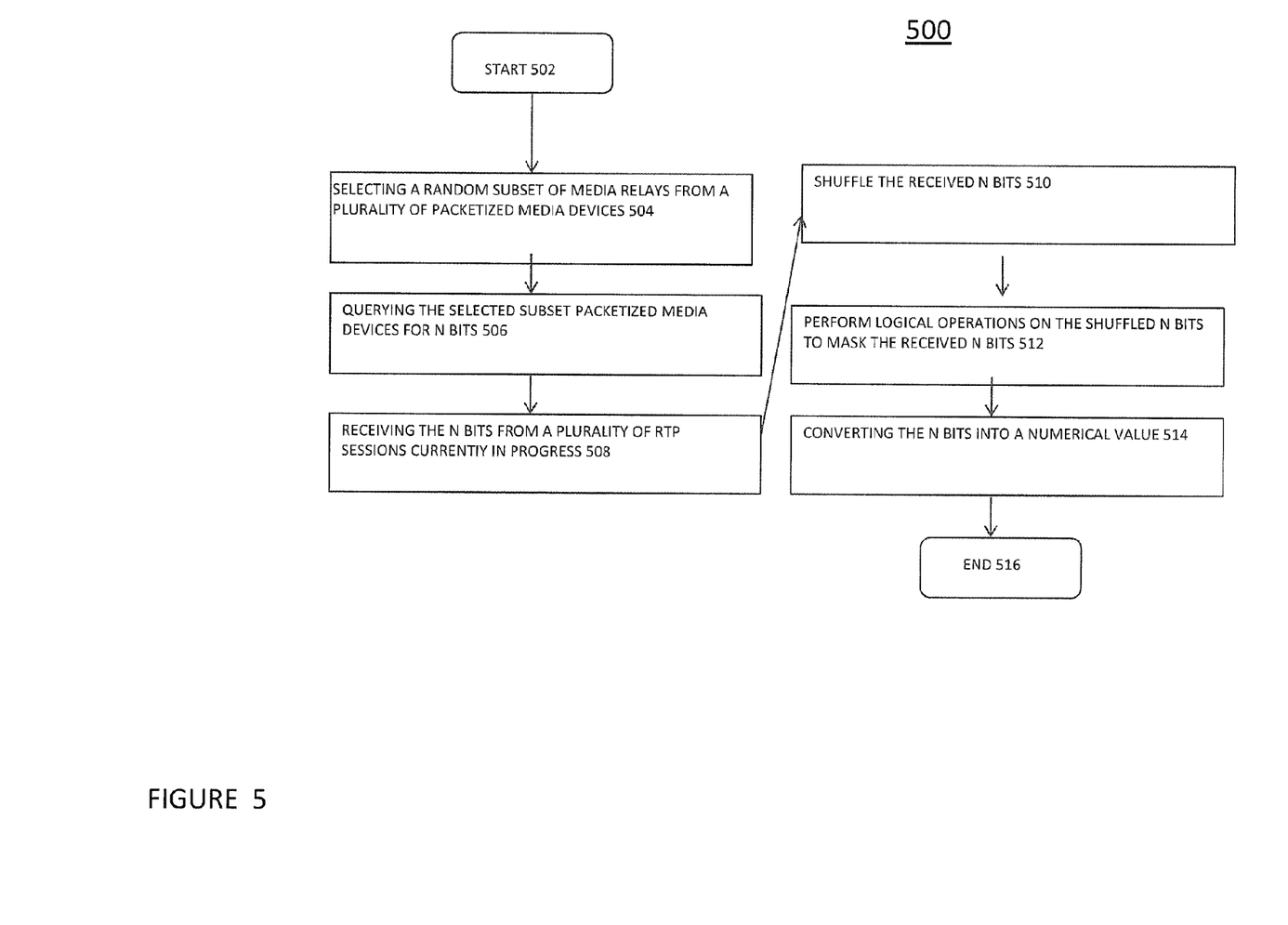
FIG. 5 depicts a flow diagram of another method for generating random numbers based on packetized media data in accordance with embodiments of the present invention.

FIG. 5 depicts a flow diagram of another method 500 for generating random numbers based on packetized media data in accordance with embodiments of the present invention. The method 500 is an implementation of the data controller 309 as executed by the processor 302 by the computer system 300 as shown in FIG. 3.

The method begins at step 502 and proceeds to step 504. At step 504, the data controller 309 selects a random subset of packetized media devices from the plurality of media relays on the network 101. At step 506, the data controller 309 queries the selected subset of packetized media devices for N bits total from the relays, or, according to another embodiment, N bits from each of the relays.

The method 500 then proceeds to step 508, where the data controller 309 receives the N bits from a plurality of RTP sessions currently in progress. Optionally, the data assembler 312 shuffles the received N bits at step 510. The method proceeds to step 512, where the assembler 312 further performs logical operations on the shuffled N bits to mask the received N bits. For example, the data assembler may take one set of receives bits from one of the packetized media devices and perform logical ANDs on the other sets of bits from the other packetized media devices, to further create randomness in the concatenated bits.

The numerical processor 316 of the random number generator 314 converts the N bits into a decimal value at step 514, and the method terminates at step 516.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A computer-implemented method for generating a random number based on packetized media data comprising:
   selecting one or more packetized media devices randomly from a plurality of packetized media devices;
   querying the one or more randomly selected packetized media devices for a predetermined number of bits from one or more real-time transport protocol (RTP) audio session;
   receiving the predetermined number of bits from the one or more packetized media devices;
   assembling the predetermined number of bits into a set of bytes; and
   converting the set of bytes into a numerical value representing the random number.

2. The method of claim 1 wherein assembling the predetermined number of bits further comprises:
   concatenating bits in temporal order from when they were received.

3. The method of claim 1 wherein assembling the predetermined number of bits further comprises:
   shuffling the received predetermined number of bits in a random order; and
   concatenating the shuffled bits into the set of bytes.

4. The method of claim 3 further comprising:
   performing logical operations on the shuffled bits to mask the predetermined bits before concatenating the shuffled bits.

5. The method of claim 4 wherein the logical operations comprise:
   performing a logical AND and a logical OR function between sets of bits received from the one or more packetized media devices.

6. The method of claim 1 further comprising:
   querying the one or packetized media devices on a periodic basis to obtain the predetermined number of bits.

7. The method of claim 1 further comprising:
   filtering the one or more RTP audio sessions prior to receiving the predetermined number of bits.

8. The method of claim 1 further comprising:
   seeding a random number generation algorithm using the numerical value.

9. An apparatus, including one or more processors, support circuits and memory, for generating a random number based on packetized media data comprising:
   a data controller, for selecting one or more packetized media devices randomly from a plurality of packetized media devices, querying the one or more randomly selected packetized media devices for a predetermined number of bits from one or more current real-time transport protocol (RTP) session, and receiving the predetermined number of bits from the one or more packetized media devices, the data controller comprising:
   a data assembler for assembling the predetermined number of bits into a set of bytes,
   wherein the data controller converts the set of bytes into a numerical value representing the random number.

10. The apparatus of claim 9 wherein the data assembler further concatenates the predetermined number of bits in temporal order when they were received to form the set of bytes.

11. The apparatus of claim 9 wherein data assembler further shuffles the received predetermined number of bits in a random order and concatenates the shuffled bits into the set of bytes.

12. The apparatus of claim 11 wherein data assembler further performs logical operations on the shuffled bits to mask the predetermined bits before concatenating the shuffled bits.

13. The apparatus of claim 12 wherein the logical operations comprise:
   performing a logical AND and a logical OR function between sets of bits received from the one or more packetized media devices.

14. The apparatus of claim 9 wherein the data controller further querying the one or packetized media devices on a periodic basis to obtain the predetermined number of bits.

15. The apparatus of claim 9 wherein the data controller further comprises a data filter for filtering the one or more RTP sessions prior to receiving the predetermined number of bits.

16. The apparatus of claim 9 the data controller is coupled to a random number generator comprising a numerical processor for seeding a random number generation algorithm using the numerical value.

17. The apparatus of claim 16 wherein the random number generator adds the numerical value to a set of random numbers.

\* \* \* \* \*